United States Patent [19]

Campbell et al.

[15] 3,704,681
[45] Dec. 5, 1972

[54] VARIABLE DEPTH, REMOTELY SELECTIVE SEISMIC CABLE DEPTH CONTROLLER

[72] Inventors: Hollis O. Campbell; John W. Fetrow; Kim L. Mitchell, all of Ponca City, Okla.

[73] Assignee: Continental Oil Company, Ponca City, Okla.

[22] Filed: June 30, 1971

[21] Appl. No.: 158,175

[52] U.S. Cl. ..............................114/235 B
[51] Int. Cl. ...................B63b 21/00, B63g 8/14
[58] Field of Search........114/235 R, 235 B; 340/3 R, 340/3 T

[56]  References Cited

UNITED STATES PATENTS 3,412,704  11/1968  Buller et al...................114/235 B
3,434,446  3/1969   Cole............................114/235 B
3,541,989  11/1970  Leonard........................114/235 B Primary Examiner—Trygve M. Blix
Attorney—Joseph C. Kotarski et al.

[57] ABSTRACT

A remotely selective cable depth controller comprising a movable air piston positioned by an electrical motor, said position controlling the volume of the air enclosure which determines the depth of the controller. The motor is driven by a solid state amplifier of low stand-by power consumption and is operated by command signals which activate a tuned reed switch in combination with a series of memory switches.

4 Claims, 6 Drawing Figures

INVENTORS
HOLLIS O. CAMPBELL
JOHN W. FETROW
BY  KIM L. MITCHELL

ATTORNEY

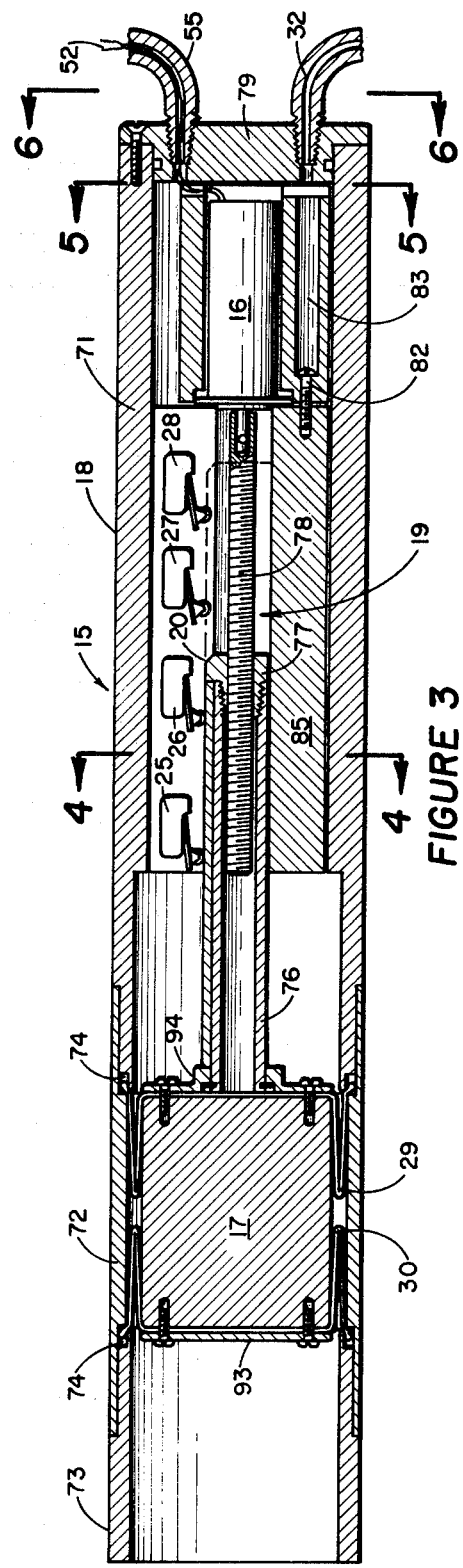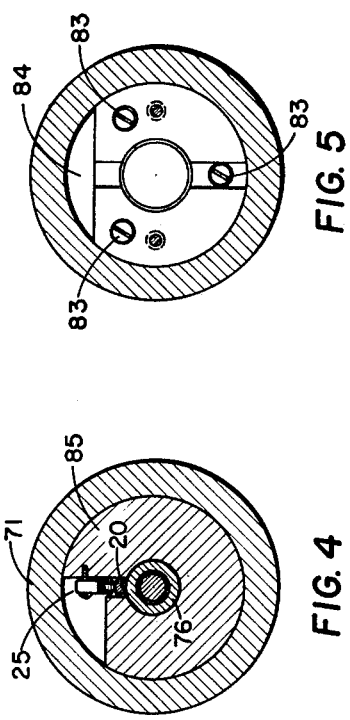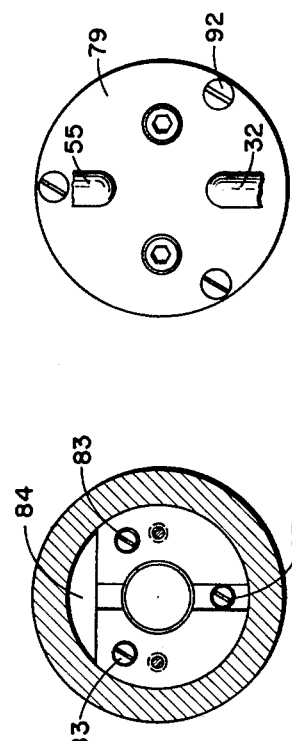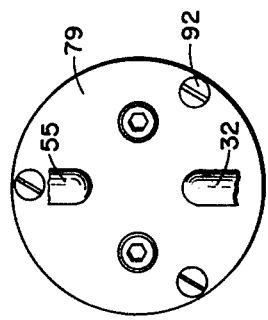

.mw3,704,681

VARIABLE DEPTH, REMOTELY SELECTIVE SEISMIC CABLE DEPTH CONTROLLER

PRIOR ART

With the invention of the fixed depth cable depth controller, U.S. Pat. No. 3,375,800 by Jimmie R. Cole and Paul L. Buller, a need arose for a cable depth controller that could change depth upon command rather than changing depth by physically stopping the boat, resetting each of the controllers for a new depth, and proceeding to use the controllers until the depth again needed to be readjusted.

Several patents have issued in an attempt to fill the need for a variable depth, remotely selective seismic cable depth controller. For example, U.S. Pat. No. 3,412,704, used a sound detector in the controller which had its output proportional to the received signal which was transmitted through the water. The controller also included a pressure responsive means which generated a signal proportional to the water depth. The detector signal and the pressure signal were combined to form an output signal utilized to operate a control means within the controller to adjust the controller to a depth indicated by the control signal.

U.S. Pat. No. 3,434,446 to Jimmie R. Cole incorporated a control means with a reed relay which would give a down or up signal to the controller. The control mechanism varied the spring tension on the paravane pressure diaphragm control system.

Applications, Ser. No. 75,387 filed Sept. 25, 1970, to Bill Smith entitled "Improvement in Apparatus for Controlling Depth of a Water-Towed Cable" disclosed a means for using the water pressure itself as part of the force available to readjust the pressure in the control system which caused the cable depth controller to seek a new depth.

BRIEF DESCRIPTION OF THE INVENTION

This invention contemplates a novel motor control system which incorporates a reed relay for obtaining a control signal output for a particular depth. The output signal operates a motor which varies the pressure in a chamber in response to the output signal from the reed relay. Operation of the motor causes a piston to move. Coupled to the piston is a cam which operates a series of memory switches. When the proper depth is reached, a corresponding switch will disconnect the motor, resulting in the cable depth controller operating at the new depth.

As in all previous cable depth controllers, the operating depth is determined by a diaphragm having air pressure on one side confined by a chamber and the other side being exposed to water pressure. A mechanical linkage couples the diaphragm movement to a pair of control vanes rotatably mounted on each side of the paravane. As the air pressure is changed by the motor-operated piston, the water pressure displaces the diaphragm, causing a corresponding rotation of the vanes. The angular displacement will cause the paravane to move up or down in the water (depending upon the air pressure change) until the water pressure and air pressure again equalize, at which time the vanes will adjust to a nearly horizontal position and the paravane will be operating at a new depth.

BRIEF DESCRIPTION OF THE DRAWINGS

FIG. 3 is a cross-sectional view of the motor and piston arrangement and internal details of the pressure control system;

FIGS. 4 and 5 are cross-sectional views of FIG. 3 taken through 4—4 and 5—5, respectively; and FIG. 6 is an end view of the assembly taken in the direction indicated 6—6 in FIG. 3.

SPECIFIC DESCRIPTION OF THE PREFERRED EMBODIMENTS

The variable cable depth controller comprises both mechanical and electrical features. The system operates basically by varying the reference pressure of a chamber which is coupled through a diaphragm mechanically to a vane. The reference chamber, when the paravane is immersed in the water, will have air inside of the chamber and water outside of the chamber. When the pressure on both sides of the diaphragm is equalized, the vane coupled thereto will be nearly horizontal.

If through a mechanical system the pressure is made to change in the reference chamber, the diaphragm will be automatically displaced accordingly, causing a change in the position of the vane. Since the vane controls the depth of the paravane, it will seek a more shallow or a greater depth in accordance with the displacement of the vane.

Figure 1:
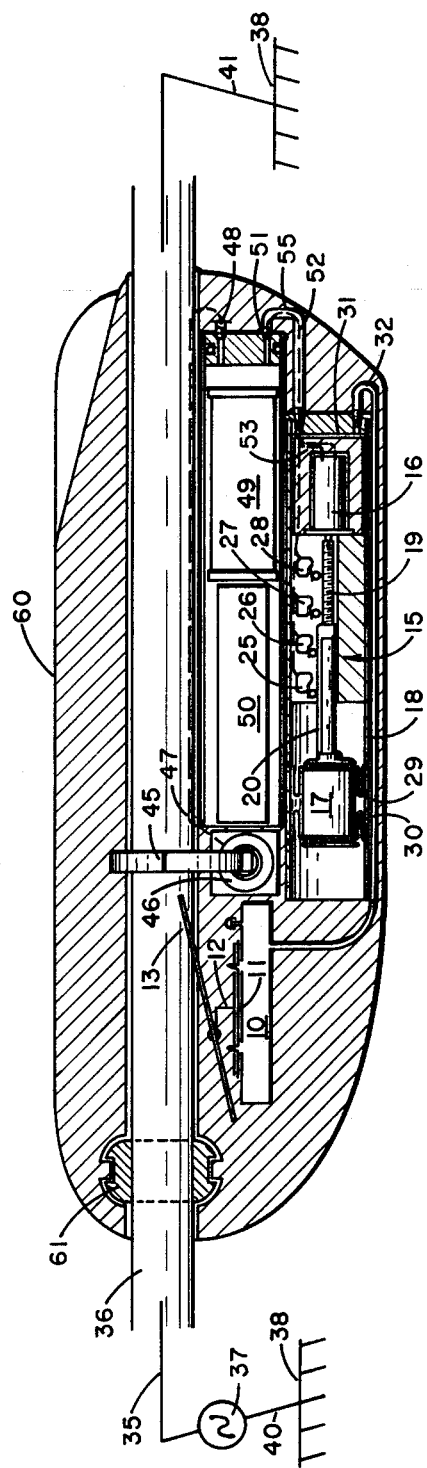
FIG. 1 is a sectional view showing the placement of the mechanical parts within the paravane.

Referring to FIG. 1, the reference chamber 10 is illustrated having a diaphragm 11 mounted to the reference chamber 10 around the outside edges and mechanically coupled through a linkage 12 to a vane 13. The variable pressure assembly is generally designated by the number 15 and basically incorporates a motor 16, a piston 17, an outer wall 18, and mechanical connecting linkage 19 coupled between the motor output shaft and the piston 17. The mechanical linkage 19 incorporates thereon a cam 20 which operates a plurality of memory switches 25, 26, 27, and 28.

A cylindrical diaphragm 29 is attached between piston 17 and outer wall 18. A second diaphragm 30 is likewise attached between the piston 17 and outer wall 18. Outer wall 18 is sealably enclosed at one end by an end plate 31. A pipe 32 is connected through end plate 31 to reference chamber 10 in a manner to communicate a change in air pressure on the inside of variable pressure chamber 15 to the inside of reference chamber 10.

The electrical portion of the circuit basically comprises a conductor 35 which is here represented as passing through a seismic cable 36. Conductor 35 may be a copper wire or the strain wire inside the seismic cable, for example. A generator 37 is connected between cable conductor 35 and the return path 38. The return path usually comprises attaching the generator lead 40 to the ship hull which in turn is floating in a body of water. The water normally contains salt and is, therefore, conductive and will permit the passage of current. The remaining end 41 is likewise connected to the return path 38.

A signal pick-up coil 45 which generally comprises a magnetic core is mounted around cable 36 so that its axis coincides with the axis of cable 36. An electrical pick-up coil 46 is mounted around core 45 and generates an output signal proportional to the signal transmitted through the wire 35 by generator 37. The output of coil 45 is transferred through a wire 47 to the input 48 of an amplifier and electrical control circuit generally referred to as 49.

A plurality of batteries 50 is used to provide electrical current to the amplifier and control circuit 49 and motor 16. The output 51 is connected from amplifier and control circuit 49 through a wire 52 to the input 53 of motor 16.

It is, of course, obvious viewing the above mechanical and electrical configurations the system must be protected against both the corrosive effects of the water when the cable controller is used in salt water, for example, and from the deterioration of the electrical properties of the components from exposure to the environment. In this regard it is found prudent to coat coil 47, for example, in epoxy resin including core 45. Batteries 50 and amplifier and control circuit 49 are encased to exclude water from contact with the circuits. As a further precaution wire 52 is encased in a pipe 55 which provides two useful purposes; first, pipe 55 will protect wire 52 from mechanical damage and second the pipe will permit air pressure to pass from the variable pressure chamber 15 to the system in the battery 50 and amplifier and control circuit 49. When the system is under pressure it is less likely that water can leak into the chamber causing damage to the components therein.

The entire configuration is enclosed in a housing 60 which is attached to the cable through a rotary bearing 61.

The signal pick-up system is completely described in application, Ser. No. 6,613 filed Jan. 28, 1970, entitled "Communication Channel Between a Boat and a Marine Cable Depth Controller" by Fetrow and Mitchell.

The compressed air pressure sensing actuator utilized in conjunction with reference chamber 15 is fully disclosed in U.S. Pat. No. 3,435,797 issued to W. L. Chapman and entitled "Compressed Air Pressure Sensing Actuator."

GENERAL OPERATION OF THE PREFERRED EMBODIMENT

A command for a change in depth is signaled to the controller by a control signal being applied to cable conductor 35 from generator 37. Pick-up coil 45 senses the signal generated in wire 35 by intercepting the magnetic flux caused by the transmitted signal. The magnetic flux will generate a corresponding electrical current in coil 46 and transmit this control signal through wire 47 to the input 48 of amplifier and control circuit 49. The internal computer in said control circuit will interpret the command and order the controller to go more shallow or deep depending upon its position with respect to the new command. An output will be generated from the control circuit 49 at output 51 which will pass through wire 52 to the input 53 of motor 16 which will operate (by rotating clockwise or counterclockwise), causing the mechanical connecting linkage 19 to move piston 17 either toward or away from the motor causing an increase or decrease, respectively, in the pressure inside chamber 15. The change in pressure will be transmitted through pipe 32 to the inside of reference chamber 10. Any change in the pressure inside reference chamber 10 will cause a displacement of the diaphragm 11 and a corresponding movement of mechanical linkage 12 which will displace vane 13 in a manner to cause the desired change in depth of the cable depth controller. As the pressure inside reference chamber 10 becomes equalized with the water pressure on the outside of said chamber, the vane will return to a nearly horizontal attitude, causing the paravane to assume the new depth.

SPECIFIC DESCRIPTION OF THE VARIABLE PRESSURE CHAMBER

Referring to FIGS. 3 through 6, a detailed mechanical drawing of the variable pressure chamber is illustrated. Numbers similar to those in the other figures will be used wherever possible. In addition to the description already given relating to the variable pressure chamber generally referred to by number 15 are details showing the mounting of the diaphragms 29 and 30, cam 20, and the connection 19 between the motor and the diaphragm. Some detail is also included illustrating the method of assembling the variable pressure chamber.

Referring in particular to FIG. 3, the outer wall 18 comprises a first tubular section 71, a second tubular section 72, mechanically joined to section 71 by threads, screws, or any other suitable means (not shown), and a third tubular section 73 attached likewise to section 72. Space 74 is left between tubular portions 73 and 72, and 72 and 71 in order to clamp the diaphragm seal securely to the wall of the outer wall 18 and yet permit free passage of the piston past the space 74. The mechanical connecting linkage between the motor 16 and the piston 17 essentially comprises a shaft 76 which includes a cam 20 having a threaded interior 77. A threaded shaft 78 is attached axially to the motor shaft and threaded into the threads 77 of shaft 76. An end portion 79 seals the end of outer wall 18, thereby preventing water from entering the chamber and air pressure within the chamber from escaping. The motor is secured by a tubular clamp 82 which is retained by screws 83.

Referring to FIG. 5 it can be seen that a space 84 is provided for removing a portion of tubular clamp 82 in order to permit the free passage of air from the piston portion of the variable pressure chamber 15 to the outlet pipes 32. A space is also provided between tubular clamp 82 and end portion 79 for the same purpose.

The memory switches 25 through 28 are positioned along the interior of the first tubular section 71 in a location corresponding to the position of the piston for the desired pressures corresponding to desired depths for the paravane. Cam 20 is designed to operate the switches as it passes under same.

FIG. 4 illustrates a section taken through 4—4 of FIG. 3 and shows tubular portion 71, tubular switch mounting means 85, shaft 76, cam 20 and switch 25.

FIG. 6 illustrates the mounting screws 92 not shown in FIG. 3 which attach the end portion to tubular portion 71. Pipes 52 and 32 are secured into end portion 79 by means of threads, cementing, or any other suitable means.

OPERATION OF THE VARIABLE PRESSURE CHAMBER

Under normal use piston 17 will have its end 93 exposed to water and its end 94 under a desired air pressure. Under this type operation the motor 16 will do the least amount of work in changing the position of the piston from one location to another. Since one of the objects of the design of this invention is to reduce to a minimum the total amount of current drained from the battery source, it is important to reduce to a minimum the work required by the motor. If the motor receives a command through wire 52 to rotate in either the clockwise or counterclockwise direction, its shaft will cause threaded shafts 78 to rotate. The threads on 78 engaging the threads 77 of shaft 76 will cause corresponding movement of shaft 76 moving the piston either toward or away from the motor. Cam 20 will strike one or more switches, moving them from the down position to the up position until the proper depth is reaches. The position of the switches furnishes a memory to the control circuit indicating upon further commands the proper direction for motor rotation in order for the paravane to reach the new depth location with the minimum amount of work. Thus, for example, if the paravane is at 10 feet and the command is for 20 feet, the cam 20 would be positioned under switch 25. The control circuit would then respond by causing the paravane to dive. If, for example, the paravane were at 30 feet and switches 25, 26, and 27 were in the up position with cam under the 27 switch, an up command would cause the motor to rotate in a way to move the cam toward switch 26 rather than switch 28. The mechanical portion of the memory system then provides absolute direction to the control circuit (the electrical operation is explained in a subsequent section), so that it will not cause the paravane to dive when an up command is given and vice versa.

SPECIFIC DESCRIPTION OF THE ELECTRICAL CONTROL CIRCUIT

Core 45, as previously explained, detects a magnetic flux passing through wire 35 which is converted to an electrical signal in coil 46 and conveyed through wire 47 to input 48 of the amplifier and control circuit. Transistors 65a, 65b, 65c, and 65d form an amplifier to boost the voltage of wire 47 to a value sufficient for operation of the subsequent circuits. The output from the amplifier is applied to the input 66 of a tuned relay 67 having a plurality of reeds 67a, 67b, 67c, and 67d, for example. Each relay will have a corresponding output 68a, 68b, 68c, and 68d, respectively, which is applied to a silicone controlled rectifier (scr) 69a through 69d, respectively. The output of scr 69a represents the shallowest depth and is applied to memory switch 25. scr 69b represents the first intermediate depth and is connected to memory switch 26. scr 69c represents a second intermediate depth below that of 69b and is connected to memory switch 27, while scr 69d represents the maximum depth and is connected to memory switch 28.

Each switch has a pole u and d. Each memory switch 25 through 27 has its u pole connected through a diode 25a through 25c, respectively. The u poles of memory switches 25 through 27 are likewise connected through control diodes 26a through 26c, respectively, to wire 71. The d pole of memory switches 26 through 28 is connected through a control diode 27b through 27d to wire 72 and control diode 28b through 28d to wire 70.

Relay 80 through coil 80a controls the down command while coil 80b controls the up command. Contacts 81 and 82 have poles d and u, respectively, connected through wires 52 to motor 16. Wire 90 supplies battery power to transistors 65a and 65b which is reduced to approximately zero during the sequencing of the operation to change the cable depth controller to a new depth.

OPERATION

A signal having a fixed frequency is passed through conductor 35, detected by core 45, converted to an electrical signal by coil 46 and applied to the input 48 of the amplifier circuit by a pair of wires 47. The signal at the input 48 is applied to the amplifying transistors 65a through 65d and then to the input 66 of tuned reed relay 67. Depending upon the particular frequency selected and being passed through wire 35, relay reed 67a, 67b, 67c, or 67d will vibrate. If, for example, 67c is vibrating, a square wave signal, such as that illustrated in 95, will appear at the output 68c charging C1c to a certain D.C. voltage which is applied to the control electrode of scr 69c. Once scr 69c is rendered conductive, it will remain conductive until the circuit is interrupted for some reason. Assuming, for the sake of example, that the cable depth controller is operating at 10 feet, memory switch 27 will be moved by a cam from the d pole to the u pole. Current will then pass through scr 69c to the memory switch 27 which is in the d position, and current will then pass from the d pole through diode 28c down wire 70 to contact 81 of latching relay 80 through motor M to contact 82 to battery 50 completing the circuit. Current will also pass through diode 27c to capacitor C which connects to coil 80a latching the relay contacts 81 and 82 in the d position completing the circuit, causing the motor to rotate moving mechanical connecting linkage 19 in a manner causing the piston to increase the pressure within variable pressure chamber 15. In so doing, a cam will progressively move each of the memory switches 26 and 27, when the proper depth is reached, from the d pole to the u pole. It should be noted that when the contacts 81 and 82 are latched in the d or u position, the voltage at transistors 65a and 65b through wire 90 will drop to nearly zero volts. Also, once capacitor C is charged, the current through relay coil 80a (or 80b) will drop to nearly zero.

In the case of memory switch 27, when the cam moves the contact from the d pole to the u pole, the flow of current is momentarily interrupted passing through scr 69c. The momentary interruption will cause the scr to be rendered nonconductive, resulting in the discontinuance of the current through the motor which will stop a change in reference pressure. The paravane will, of course, continue to move in downward direction until the new depth is reached and will cause the water pressure on the outside of diaphragm 11 to balance the new pressure on the inside of reference chamber 10.

If a different frequency is selected, for example, a frequency identical to the frequency of reed relay 67a, the paravane being at a depth corresponding to the frequency selected for reed relay 67c, an up command will be necessary. Reed relay 67a will generate a D.C. trigger signal at the control electrode of scr 69a, causing it to be rendered conductive.

From the previous discussion it should be remembered that a cam has moved the contact of memory switches 25, 26, and 27 into contact with the u pole. The current will then flow from the u pole through diode 25a down wire 70 to the contacts 81 and 82 of the motor directional control switch. Current will likewise flow through control diode 26a to wire 71 which is connected to the up coil 80b of relay 80, causing the contacts 81 and 82 to move from the center position to the u pole of the motor. The motor will then rotate in a direction to move piston 17 in a direction away from the motor, causing a decrease in the air pressure in variable pressure chamber 15 resulting in a corresponding decrease in pressure in reference chamber 10. As the mechanically connected linkage 19 moves the piston away from the motor, a cam will cause the switches 27, 26, and ultimately 25 to move from the u pole to the d pole. Once switch 25 moves from the u pole to the d pole, the current passing through scr 69 will be momentarily interrupted, causing the scr to become nonconductive.

In all cases, whether the circuit is given a down command or an up command, a biasing potential will appear on wire 90 applying a voltage to transistor 65b and transistor 65a, rendering both nonconductive and causing the amplifier to become inoperative during the period the control signal is being applied to the motor.

Figure 2:
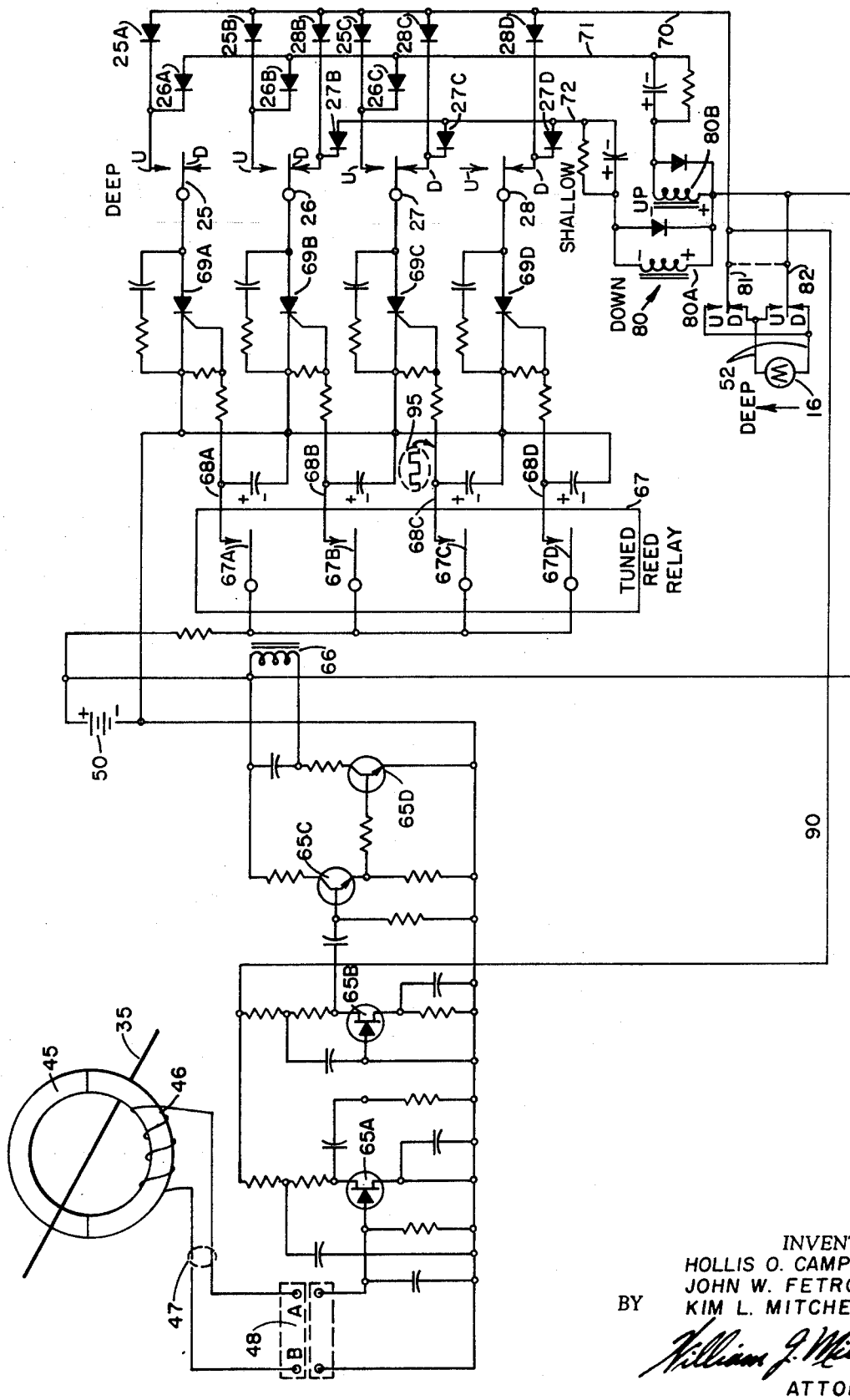
FIG. 2 is an electrical schematic of the control circuit used to operate the variable depth cable depth controller.

Four different reed relays have been illustrated in the particular electrical embodiment shown in FIG. 2. It is obvious, of course, that more or less than four reed relays can be incorporated, resulting in more or less selective depths for the controller. To add additional depths the system shown for intermediate relays 67b and 67c may be added. To reduce the depth desired, an intermediate relay and corresponding circuit 67b and/or 67c may be omitted.

The preferred embodiment actually constructed, the initial absolute pressure was set at 19.5 pounds which would make the paravane operate at a depth of 10 feet minimum. The control circuit was then set to go in steps of 20 feet, 30 feet, and 40 feet as the maximum depth. It is obvious that higher initial pressures could be used, the range divided into similar steps, and the total distances between the steps varied. Additional steps of those disclosed can also be added in the manner previously described. The several command signals were set 50 cycles apart. Each select frequency had a corresponding selected tuned reed switch. There is no limit on the particular frequencies involved or the type of frequency selective system used. For example, a band pass filter could be used.

The advantages of the circuit above disclosed provide for an extremely low current drain during a period of nonuse. As an example, the current drain was of the order of 0.0015 ampere, permitting at least a week's operation of the controller before recharging of the batteries would be required. The batteries used in the preferred embodiment were 1,000 miliampere hour Nicad rechargeable batteries. With the unique biasing system disclosed in this embodiment, the amplifiers were de-energized during the control period. De-energization prevents a command contrary to the command already given the paravane from having any effect during the period the paravane is selecting its new depth.

It is obvious that other features and advantages of this invention will become apparent to those skilled in the art. It is further obvious that changes and modifications can be made in the amplifiers, memory circuits, and mechanical elements of this invention and still be within the teachings of this invention as set out in the specifications and the appended claims.

We claim:

1. A selective depth, cable depth controller responsive to a control voltage and including a housing, a reference chamber, vanes, and mechanical coupling means between said reference chamber and said vanes comprising:
   a. Control voltage pickup means,
   b. Frequency selective circuit means having an input and frequency responsive outputs,
   c. Means for connecting the output of said frequency selective circuit means to the control voltage pickup means,
   d. Controlled switch means each having its input connected to an output of said frequency responsive outputs,
   e. Memory means,
   f. Motor means,
   g. Motor control means having an output coupled to said motor,
   h. Means coupling said memory means between said controlled switch means and said motor control means,
   i. Variable pressure chamber means, having a piston means therein, means mechanically coupling said motor to said piston means and to said memory means, and
   j. Means for communicating a change in pressure of said variable pressure chamber to said reference chamber.

2. A cable depth controller as described in claim 1 wherein said memory means comprises a plurality of switches coupled so that they can be actuated by said variable pressure chamber means.

3. A device as described in claim 1 and additionally including electrical means for engaging the input amplifiers during the period said cable depth controller is seeking a new depth.

4. A device as described in claim 1 wherein said controlled switch means comprises a silicone controlled rectifier.

* * * * *